US012192731B2

(12) United States Patent
Ge et al.

(10) Patent No.: US 12,192,731 B2
(45) Date of Patent: Jan. 7, 2025

(54) SOUND-PRODUCING APPARATUS, ACOUSTIC MODULE PROVIDED WITH SOUND-PRODUCING APPARATUS, AND ELECTRONIC DEVICE

(71) Applicant: Goertek Inc., Shandong (CN)

(72) Inventors: Lianshan Ge, Weifang (CN); Xinglong Wang, Weifang (CN)

(73) Assignee: Goertek Inc., Shandong (CN)

( * ) Notice: Subject to any disclaimer, the term of this patent is extended or adjusted under 35 U.S.C. 154(b) by 350 days.

(21) Appl. No.: 17/764,868

(22) PCT Filed: Dec. 24, 2019

(86) PCT No.: PCT/CN2019/127897
§ 371 (c)(1),
(2) Date: Mar. 29, 2022

(87) PCT Pub. No.: WO2021/062955
PCT Pub. Date: Apr. 8, 2021

(65) Prior Publication Data

US 2022/0345824 A1 Oct. 27, 2022

(30) Foreign Application Priority Data

Sep. 30, 2019 (CN) ......................... 201910940299.1

(51) Int. Cl.
*H04R 9/04* (2006.01)
*H04R 7/04* (2006.01)
(Continued)

(52) U.S. Cl.
CPC ................. *H04R 9/04* (2013.01); *H04R 7/04* (2013.01); *H04R 9/027* (2013.01); *H04R 9/06* (2013.01); *H04R 2209/022* (2013.01)

(58) Field of Classification Search
CPC . H04R 9/04; H04R 7/04; H04R 9/027; H04R 9/06; H04R 2209/022;
(Continued)

(56) References Cited

U.S. PATENT DOCUMENTS 5,903,076 A * 5/1999 Suyama .................. B06B 1/045 381/396
8,553,924 B2 * 10/2013 Sumiyama ............... H04R 1/22 381/386

FOREIGN PATENT DOCUMENTS

CN 102036150 A * 4/2011 ............... H04R 9/06
CN 102792380 A 11/2012
(Continued)

*Primary Examiner* — Angelica M McKinney
(74) *Attorney, Agent, or Firm* — Baker Botts LLP

(57) ABSTRACT

Disclosed is a sound-producing apparatus, including a vibration assembly and a magnetic circuit assembly, the vibration assembly includes a diaphragm which vibrates to generate sound waves, wherein, a middle region of the magnetic circuit assembly is hollowed out to form a volume expansion cavity penetrating through the magnetic circuit assembly, with a flexible deformation portion being provided in a region of the magnetic circuit assembly located in the volume expansion cavity; the flexible deformation portion covers a port of the volume expansion cavity or separates the volume expansion cavity into two regions that are isolated from each other; the flexible deformation portion is disposed facing the diaphragm, and can vibrate as a function of air pressure.

13 Claims, 5 Drawing Sheets

(51) Int. Cl.
*H04R 9/02* (2006.01)
*H04R 9/06* (2006.01)

(58) Field of Classification Search
CPC .... H04R 1/2819; H04R 1/2834; H04R 9/025; H04R 7/16; H04R 7/26
See application file for complete search history.

(56) References Cited

FOREIGN PATENT DOCUMENTS

| | | | | | |
|---|---|---|---|---|---|
| CN | 105933832 | A | | 9/2016 | |
| CN | 207835800 | U | * | 9/2018 | ........... H04R 1/2811 |
| CN | 207835804 | U | * | 9/2018 | ............... H04R 9/06 |
| CN | 208285531 | U | * | 12/2018 | ............... H04R 9/06 |
| CN | 208386918 | U | | 1/2019 | |
| CN | 109803215 | A | | 5/2019 | |
| CN | 110198510 | A | | 9/2019 | |

* cited by examiner

SOUND-PRODUCING APPARATUS, ACOUSTIC MODULE PROVIDED WITH SOUND-PRODUCING APPARATUS, AND ELECTRONIC DEVICE

CROSS-REFERENCE TO RELATED APPLICATIONS

This application is a National Stage of International Application No. PCT/CN2019/127897, filed on Dec. 24, 2019, which claims priority to Chinese Patent Application No. 201910940299.1, filed on Sep. 30, 2019, both of which are hereby incorporated by reference in their entireties.

TECHNICAL FIELD

The present disclosure relates to the field of acoustics, and particularly to a sound-producing apparatus, an acoustic module provided with the sound-producing apparatus, and an electronic device.

BACKGROUND

Generally speaking, an acoustic system with a conventional structure includes a closed box and a sound-producing unit disposed on the closed box, with a cavity formed therebetween. Due to the limited volume of a cavity in the acoustic system, it is difficult for the acoustic system, especially a small acoustic system, to achieve satisfactory bass reproduction effect. Conventionally, in order to achieve satisfactory bass reproduction in the acoustic system, two methods are usually adopted: one is to set the sound-adsorbing material in the box of the acoustic system to adsorb or desorb the gas in the box, thereby increasing the volume and thus reducing the low frequency resonance frequency; the other is to provide a passive radiator on the box of the acoustic system.

Both of the above methods, however, have problems. The first solution of adding the sound-adsorbing material into the box needs to achieve a good sealing package of the sound-adsorbing material; otherwise, if the sound-adsorbing material enters into the sound-producing unit, it will harm the acoustic performance of the sound-producing unit and influence the service life of the sound-producing unit. The second solution using the passive radiator can only improve the sensitivity of the frequency band near the resonance point, and cannot improve all the low frequency bands.

Therefore, there is a need for providing a new sound-producing apparatus so as to improve its bass reproduction effect.

SUMMARY

An objective of the present disclosure is to provide a new sound-producing apparatus which may significantly improve the bass reproduction effect of the sound-producing apparatus.

In order to solve the above-mentioned technical problem, the technical solution provided by the present disclosure is: a sound-producing apparatus, including a vibration assembly and a magnetic circuit assembly, the vibration assembly includes a diaphragm which vibrates to generate sound waves, wherein, a middle region of the magnetic circuit assembly is hollowed out to form a volume expansion cavity penetrating through the magnetic circuit assembly, with a flexible deformation portion being provided in a region of the magnetic circuit assembly located in the volume expansion cavity; the flexible deformation portion covers a port of the volume expansion cavity or separates the volume expansion cavity into two regions that are isolated from each other; the flexible deformation portion is disposed facing the diaphragm, and can vibrate as a function of air pressure. The sound-producing apparatus increases the equivalent volume of the back acoustic cavity of the sound-producing apparatus, and improves the sensitivity of the sound-producing apparatus at low frequencies.

Preferably, the magnetic circuit assembly includes an upper flux concentrating plate, a magnet and a lower flux concentrating plate which are combined in sequence; the flexible deformation portion is combined with the upper flux concentrating plate, or the flexible deformation portion is combined with the magnet, or the flexible deformation portion is combined with the lower flux concentrating plate; or, the flexible deformation portion is combined between the upper flux concentrating plate and the magnet, or the flexible deformation portion is combined between the magnet and the lower flux concentrating plate.

Preferably, the flexible deformation portion includes a middle portion located in the middle thereof, an edge portion located at the edge thereof, and a fixation portion located on an outer periphery of the edge portion; the middle portion is a plane structure, the edge portion is a convex cambered surface structure, and the fixation portion is used for fixing and combining with the magnetic circuit assembly into an integrated whole.

Preferably, a support ring is provided between the flexible deformation portion and the magnetic circuit assembly, or the fixation portion of the flexible deformation portion is directly fixed and combined with the magnetic circuit assembly.

Preferably, the flexible deformation portion is fixed and combined with the upper flux concentrating plate, with a sinker for fixing the flexible deformation portion at a position on the upper flux concentrating plate corresponding to the fixation portion; the flexible deformation portion is combined with a side of the upper flux concentrating plate close to the diaphragm, and the sinker is provided on an upper edge of the upper flux concentrating plate; or, the flexible deformation portion is combined with a side of the upper flux concentrating plate away from the diaphragm, a lower edge of the upper flux concentrating plate is provided with the sinker, the upper flux concentrating plate is provided with an extension portion extending in the horizontal direction on a side of the volume expansion cavity, and the sinker is provided on the extending portion of the upper flux concentrating plate protruding from the magnet.

Preferably, the flexible deformation portion has an edge portion protruding downward, and is free from collision with the diaphragm during vibration.

Preferably, a whole or partial area of the flexible deformation portion is at least made of at least one of TPU, TPEE, LCP, PAR, PC, PA, PPA, PEEK, PEI, PEN, PES, PET, PI, PPS, PPSU, PSU, rubber or silicone rubber.

Preferably, the flexible deformation portion is a planar structure; or, the flexible deformation portion has a planar structure in the middle thereof and a wave-shaped structure at the edge thereof.

Preferably, the flexible deformation portion is located in the volume expansion cavity, and has an uppermost end not higher than an upper end surface of the volume expansion cavity and a lowermost end not lower than the lower end surface of the volume expansion cavity; and when vibrating downward, the flexible deformation portion at the maximum displacement is not lower than the lower end surface of the volume expansion cavity.

Preferably, the lower flux concentrating plate is provided with a sound leakage hole at an edge thereof, and a distance between the sound leakage hole and the diaphragm is greater than a distance between the flexible deformation part and the diaphragm.

Preferably, the volume expansion cavity and the magnetic circuit assembly have the same shape and are disposed concentrically; the flexible deformation portion has the same shape as that of the volume expansion cavity.

Preferably, the magnetic circuit assembly includes a central magnetic circuit located at the center thereof and a side magnetic circuit located at an edge thereof; and the volume expansion cavity is provided in a middle region of the central magnetic circuit and penetrates through the magnetic circuit assembly.

Preferably, a shield covering the volume expansion cavity is provided at a position on an outer surface of the lower flux concentrating plate which position faces the volume expansion cavity, the shield being a breathable component.

Also disclosed is an acoustic module, wherein, including the above mentioned sound-producing apparatus, the acoustic module has a cavity, and the volume expansion cavity is in communication with the cavity of the acoustic module.

Also disclosed is an electronic device, wherein, including the above mentioned sound-producing apparatus, the electronic device has a cavity, and the volume expansion cavity is in communication with the cavity of the electronic device; or, the electronic device includes the above mentioned acoustic module.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are combined in the description and constitute a part of the description, illustrate embodiments of the present disclosure and, together with the description thereof, serve to explain the principles of the present disclosure.

DETAILED DESCRIPTION

Figure 1:
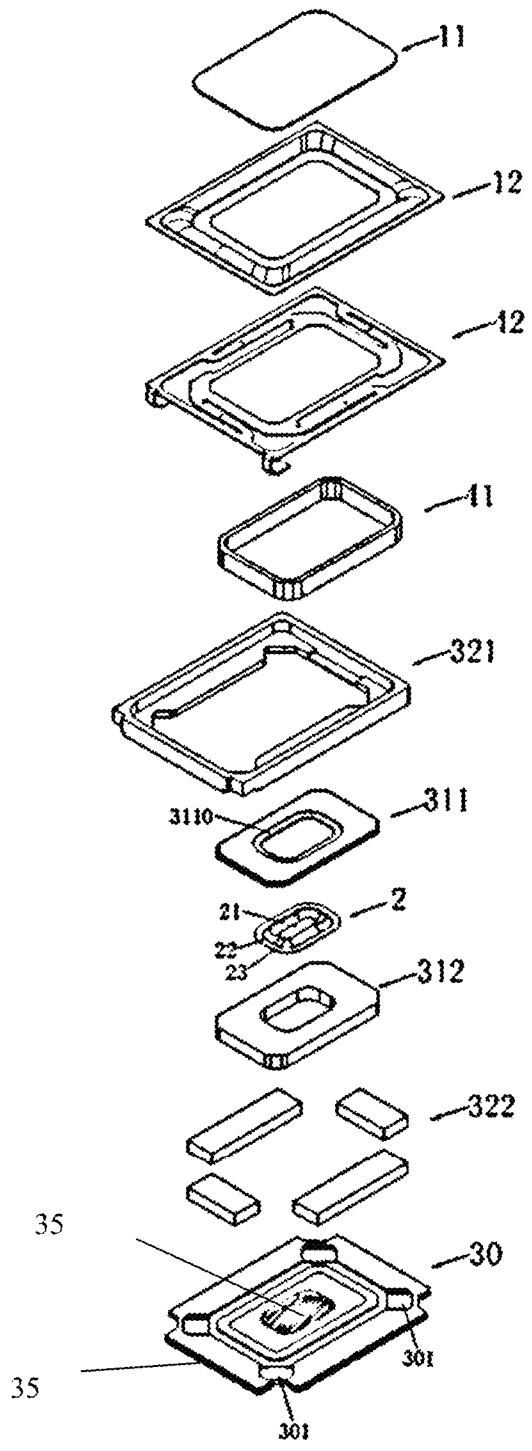
FIG. 1 is a schematic exploded perspective view of a sound-producing device provided by the present disclosure.

Various exemplary embodiments of the present disclosure will now be described in detail with reference to the accompanying drawings. It should be noted that the relative arrangement, numerical expressions and numerical values of the components and steps set forth in these examples do not limit the scope of the disclosure unless otherwise specified.

The following description of at least one exemplary embodiment is in fact merely illustrative and is in no way intended as a limitation to the present disclosure and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

EMBODIMENT 1

Figure 2:
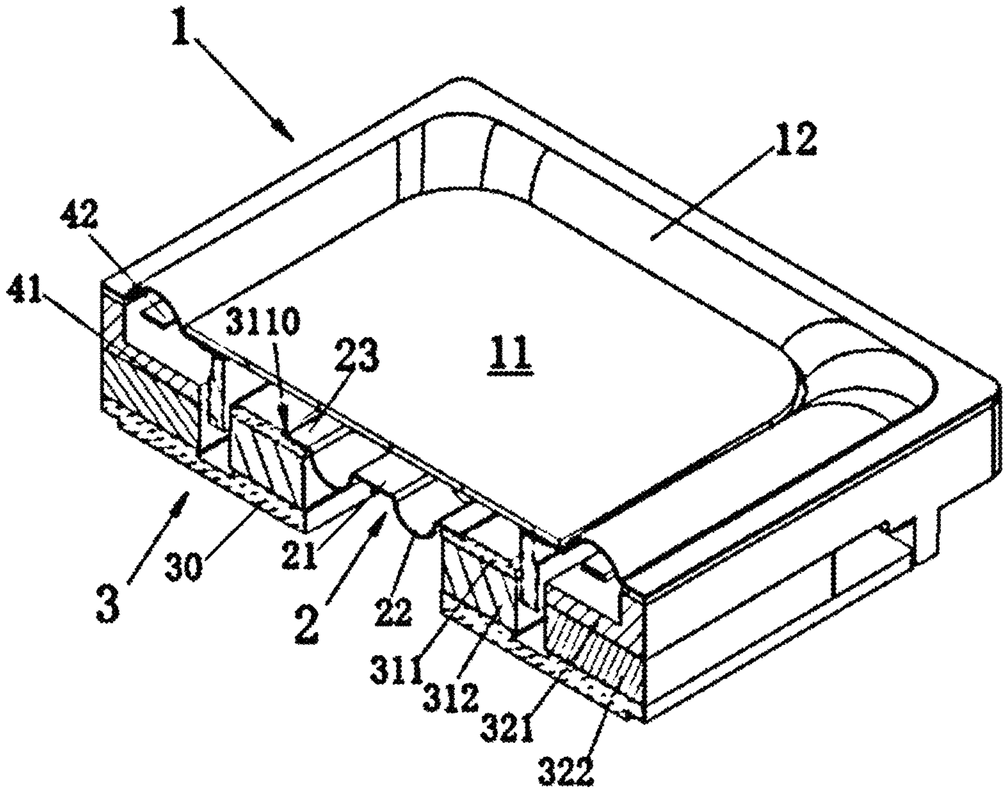
FIG. 2 is a cross-sectional view of the sound-producing device provided by the present disclosure.
Figure 3:
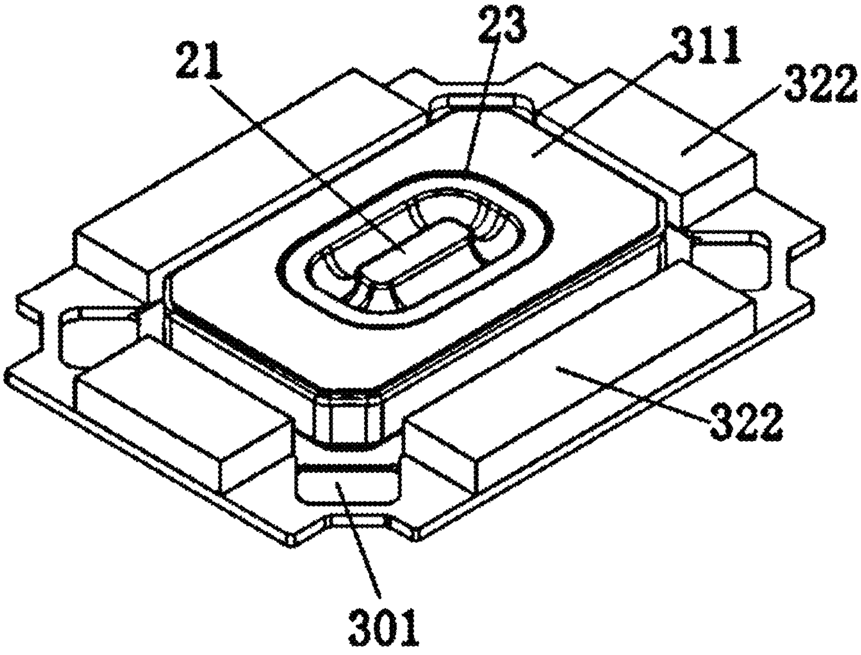
FIG. 3 is a schematic structural perspective view of an assembled magnetic circuit assembly of the sound-producing device provided by the present disclosure.

As shown in FIGS. 1-3, the sound-producing apparatus provided by the present disclosure includes a vibration assembly and a magnetic circuit assembly 3, wherein the vibration assembly includes a diaphragm 1 and a voice coil 41 combined on the lower side of the diaphragm 1, wherein "upper" and "lower" are defined with respect to the structure shown in FIG. 2. The diaphragm 1 includes a middle portion 11 located in the middle thereof and a corrugated rim portion 12 located at the edge thereof, wherein the middle portion 11 is a rigid material with a strength greater than that of the corrugated rim portion 12 and is free from deformation during vibration. The magnetic circuit assembly 3 is located below the diaphragm 1 and is a dual magnetic circuit structure including a central magnetic circuit located in the center and a side magnetic circuit located at the edge. A magnetic gap for accommodating the voice coil 41 is formed between the central magnetic circuit and the side magnetic circuit. After the voice coil is connected to the electrical signal, it vibrates up and down under an ampere force in a magnetic field generated by the magnetic circuit assembly 3, and drives the diaphragm 1 to vibrate to produce a sound wave. The central magnetic circuit of the magnetic circuit assembly 3 includes a laminated combination of a first upper flux concentrating plate 311 and a central magnet 312. The side magnetic circuit includes a laminated combination of a second upper flux concentrating plate 321 and a side magnet 322. A lower flux concentrating plate 30 is also combined to the bottom of the central magnet 312 and the side magnet 322. Here, the first upper flux concentrating plate 311, the second upper flux concentrating plate 321 and the lower flux concentrating plate 30 are all made of magnetically conductive materials. By correcting the lines of magnetic force generated by the central magnet 312 and the side magnets 322, a relatively uniform magnetic field can be created at the magnetic gap of the magnetic circuit assembly 3, which facilitates stable vibration of the voice coil 41. The magnetic field of the magnetic circuit assembly 3, however, is not absolutely uniform. Therefore, the voice coil 41 is subjected to a horizontal force in the magnetic field, which may cause a collision between the voice coil 41 and the magnetic circuit assembly to generate noise. As an improvement, a damper 42 is provided on an upper end face of the voice coil 41, and the damper 42 is fixed and integrated with the voice coil 41, which can prevent the voice coil 41 from polarization in the horizontal direction, and ensure the acoustic performance of the sound-producing apparatus.

The sound-producing apparatus of the present embodiment does not include a shell in the conventional structure for housing and fixing the vibration component and the magnetic circuit assembly. Firstly, the shell in the conventional structure has a function of housing and fixing internal assemblies; and secondly, by combining an electrical connector into the shell by injection molding, etc., the shell can be used as a carrier for electrically connecting an internal circuit and an external circuit. The above two functions are specifically implemented in the sound-producing apparatus of the present disclosure as follows: The diaphragm 1, the voice coil 41 and the damper 42 of the vibration assembly are fixed and combined into an integrated whole, the magnetic circuit assembly 3 is fixed and combined into an integrated whole, and then the vibration assembly and the magnetic circuit assembly 3 are integrated into a single structure, thereby forming the sound-producing apparatus. Specifically, the second upper flux concentrating plate 321 at the outer edge of the magnetic circuit assembly 3 is provided with a raised tab, and the edge of the diaphragm 1 is fixed and combined to the tab so as to realize the integration of the vibration assembly and the magnetic circuit assembly 3. For the function as the carrier for the electrical connector, in the sound-producing apparatus in this structure, the damper 42 of the present embodiment is provided with a pad for electrically connecting the external circuit, and is also provided with a conductive circuit, so that the electrical connection of a lead of the voice coil 41 to the external circuit is realized through the damper 42. This sound-producing apparatus which removes the shell may maximize the size of the magnetic circuit assembly 3, i.e., the outer edge of the magnetic circuit assembly 3 may extend to the position occupied by the shell in the prior art, so that it is possible to significantly enhance the magnetic performance of the sound-producing apparatus and further improve the acoustic performance of the sound-producing apparatus.

Referring to FIG. 2, sound waves on the upper side of the diaphragm 1 are directly radiated to the outside and can be received by the human ear, while sound waves on the lower side of the diaphragm 1 (that is, the side of the diaphragm 1 close to the magnetic circuit assembly 3) are enclosed inside the sound-producing apparatus and cannot be in directly communication with the sound waves on the upper side of the diaphragm 1 since the phase difference between these two sound waves is 180 degrees. Nevertheless, if connected, the two sound waves will cancel each other to form an acoustic short circuit. The back acoustic cavity is formed on the side of the diaphragm 1 near the magnetic circuit assembly 3. As mentioned above, the sound waves in the back acoustic cavity are not in communication with the outside, and since the back acoustic cavity is of a limited space, the air pressure in the back acoustic cavity will become larger or smaller as the diaphragm 1 vibrates up and down, which will prevent the diaphragm 1 from vibrating freely with the electrical signal, and will form a resistance to the vibration of the diaphragm 1. Therefore, in an ideal state, the volume of the back acoustic cavity should be large enough, and the air pressure inside the back acoustic cavity should be the same as the air pressure on the upper side of the diaphragm 1 (i.e., the external air pressure), so that the diaphragm 1 can vibrate freely. This ideal state, however, is difficult to achieve. Typically, the sensitivity of diaphragm 1 is significantly reduced at large amplitudes, mainly in the low frequency range due to the limitation on the space of the back acoustic cavity.

In order to improve the low frequency performance and increase the volume of the back acoustic cavity in a limited space, the lower flux concentrating plate 30 of the magnetic circuit assembly 3 of the present disclosure is provided with an sound leakage hole 301, which may be in communication with a cavity in the acoustic module or electronic device, so that the space in the acoustic module or electronic device can also be used as part of the back acoustic cavity, thereby increasing the volume of the back acoustic cavity. In addition, in the present disclosure, a volume expansion cavity penetrating the magnetic circuit assembly 3 is hollowed out in the middle region of the magnetic circuit assembly 3, and the volume expansion cavity is provided to increase the volume of the back acoustic cavity of the sound-producing apparatus and to improve the sensitivity at low frequencies. Since the middle region of the magnetic circuit assembly 3 is far from the magnetic gap and thus has a limited contribution to the magnetic field strength, removing a portion of the middle region of the magnetic circuit assembly 3 does not significantly degrade the magnetic performance of the magnetic circuit assembly 3. Also, the sound-producing apparatus of the present disclosure does not have a shell, and the size of the magnetic circuit assembly 3 has been maximized. Based on this structure, the hollowed-out middle region of the magnetic circuit assembly 3 does not significantly influence the magnetic performance.

As an improvement, in the present disclosure, a flexible deformation portion 2 is provided in the area of the magnetic circuit assembly 3 located in the volume expansion cavity. The flexible deformation portion 2 is disposed facing the diaphragm 1 and can vibrate up and down. The flexible deformation portion 2 covers a port of the volume expansion cavity or separates the volume expansion cavity into two regions that are isolated from each other. When the diaphragm 1 vibrates upward, the air pressure between the diaphragm 1 and the first upper flux concentrating plate 311 decreases rapidly, and accordingly, the air pressure on the upper side of the flexible deformation portion 2 is smaller than the air pressure on the lower side thereof. At this moment, the flexible deformation portion 2 vibrates upward, thereby slowing down the speed of reduction in the air pressure between the diaphragm 1 and the first upper flux concentrating plate 311. When the diaphragm 1 vibrates downward, the air pressure between the diaphragm 1 and the first upper flux concentrating plate 311 increases rapidly, and accordingly, the air pressure on the upper side of the flexible deformation portion 2 is greater than the air pressure on the lower side thereof. At this moment, the flexible deformation portion 2 vibrates downward, thereby slowing down the speed of the increase in the air pressure between the diaphragm 1 and the first upper flux concentrating plate 311. Since the flexible deformation portion 2 is provided, and the flexible deformation portion 2 can quickly respond to the air pressure change caused by the vibration of the diaphragm 2, it is possible to equalize the air pressure of the diaphragm 1 close to the first upper flux concentrating plate 311, increase the equivalent volume of the back acoustic cavity, and improve the sensitivity of the sound-producing apparatus at low frequencies.

The body of the flexible deformation portion 2 may be made of plastic material, thermoplastic elastomer material, or silicon rubber material, and may be a one-layer or multi-layer composite structure. In addition, the body of the flexible deformation portion may be a flat plate, or a partially convex or concave structure, such as a structure with a convex central portion, or with a convex edge portion, or with a convex central portion and a convex edge portion. Specifically, the whole or part of the flexible deformation portion 2 is made of at least one of TPU, TPEE, LCP, PAR, PC, PA, PPA, PEEK, PEI, PEN, PES, PET, PI, PPS, PPSU, and PSU. The flexible deformation portion has a thickness less than or equal to 0.5 mm; otherwise, if the thickness of the flexible deformation portion is too large, its strength will increase and its compliance will decrease, which is not conducive to deformation.

Further, in order to improve the vibration effect, a composite sheet may also be superimposed on the middle portion of the flexible deformation portion 2, is of strength higher than that of the body of the flexible deformation portion, and may be metal, plastic, carbon fiber or their composite structure and so on. In addition, the flexible deformation portion 2 may be a planar integral structure, or may be a structure with a hollowed-out middle portion and a composite sheet. In the case where only the edge portion remains in the structure of the flexible deformation portion 2 with the hollowed-out middle portion, the edge portion may be in a flat shape, a shape that protrudes toward a side, or a wavy shape. Of course, the flexible deformation portion 2 may be a planar structure as a whole, and the flexible deformation portion 2 in the planar structure may also vibrate up and down.

In this embodiment, the flexible deformation portion 2 includes a planar middle portion 21 located in the middle thereof and an edge portion 22 located at the edge thereof. The edge portion 22 is provided with a protrusion with a shape of a cambered surface, or the edge portion 22 has a wave-shaped structure, which is beneficial to reducing the height of the flexible deformation portion and increasing the flexibility of the flexible deformation portion 2, so that the flexible deformation portion 2 has a better adjustment effect.

The flexible deformation portion 2 may be combined on the first upper flux concentrating plate 311, or may be combined on central magnet 312, or may be combined on the lower flux concentrating plate 30, or may be combined between the first upper flux concentrating plate 311 and the central magnet 312, or may be combined between the lower flux concentrating plate 30 and the central magnet 312, none of the above influencing the implementation of the present disclosure. Preferably, the flexible deformation portion 2 of the present disclosure is combined on the side close to the diaphragm 1. Specifically, in a case where the flexible deformation portion 2 is combined on the first upper flux concentrating plate 311, this structure where the flexible deformation portion 2 is combined on the first upper flux concentrating plate 311 is closer to the diaphragm 1 and therefore facilitates a quick response. Moreover, this structure where the flexible deformation portion 2 is provided on the first upper flux concentrating plate 311 makes the distance between the diaphragm 1 and the sound leakage hole 301 greater than the distance between the diaphragm 1 and the flexible deformation portion 2, makes the effect of the flexible deformation portion 2 more significant and is more conducive to improving the sensitivity of the sound-producing apparatus at low frequencies.

For the magnetic circuit assembly 3 with a dual magnetic circuit structure, the volume expansion cavity is provided in the middle region of the central magnetic circuit as shown in FIG. 2 and FIG. 3, where the second upper flux concentrating plate 321 is removed in FIG. 3 to clearly show the structures of the leakage hole 301 and the side magnet 322. Preferably, the volume expansion cavity and the central magnetic circuit 31 have the same shape and are set concentrically, i.e., the two have overlapping centers and corresponding shapes, so that the stability of the magnetic field of the central magnetic circuit can be ensured. The shape of the magnetic circuit assembly 3 in the present embodiment is the same as the shape of the diaphragm 1 and the voice coil 41, and they are all rectangular in structure. An open end of the corresponding volume expansion cavity at the first upper flux concentrating plate 311 is also rectangular in shape; the flexible deformation portion 2 which is incorporated in the volume expansion cavity is also rectangular in shape, and is provided facing the middle portion 11 of the diaphragm 1.

In this embodiment, the outer edge of the flexible deformation portion 2 is provided with a fixation portion 23 that is fixed and combined with the magnetic circuit assembly 3, the outer periphery of the edge portion 22 where the fixation portion 23 is provided having a planar structure. A sinker 3110 is provided at the position where the first upper flux concentrating plate 311 is fixed and combined with the flexible deformation portion 2. As shown in FIG. 2, the fixation portion 23 and the sinker 3110 are directly fixed and combined into an integrated whole by means of a gel. As other preferred embodiments, the sound-producing apparatus may also be provided with a support member which is a rigid ring structure. The flexible deformation portion 2 and the first upper flux concentrating plate 311 are fixed and combined into an integrated whole by the support member, wherein the support member is provided corresponding to the fixation portion 23. In the combining process, after the flexible deformation portion 2 and the support member are fixed and combined into an integrated whole, the combination of the flexible deformation portion 2 and the support member can be fixed and combined with the sinker 3110 of the first upper flux concentrating plate 311. Since the flexible deformation portion 2 is a relatively small structure, providing the support member is beneficial to maintain the shape of the flexible deformation portion 2. In addition, when the flexible deformation portion 2 and the support member as a whole are combined with the magnetic circuit assembly 3, the process is simpler. When providing the support member, the support member between the flexible deformation portion 2 and the sinker 3110 separates the two from each other, so that the heat generated during the operation of the magnetic circuit assembly 3 will not be directly transferred to the flexible deformation portion 2, thereby reducing the risk of the flexible deformation portion 2 detaching from the first upper flux concentrating plate 311. Although the support member is not shown in the structure shown in FIG. 2, it should be understood that a support member may be provided between the flexible deformation portion 2 and the first upper flux concentrating plate 311, and it is also within the protection scope of the present disclosure when a support member is provided between the two. When the sinker 3110 is provided in such a way that the flexible deformation portion 2 is fixed and combined with the first upper flux concentrating plate 311, the flexible deformation portion 2 does not protrude from the surface of the first upper flux concentrating plate 311 and thus does not excessively occupy the internal space of the sound-producing apparatus, and therefore there is no need to provide additional avoidance space or avoidance structure for the flexible deformation portion 2. When the support flexible deformation portion 2 is provided with the support member, the recessed depth of the sinker 3110 should be greater than the sum of the thicknesses of the fixation portion 23 and the support member, so as to avoid the flexible deformation portion 2 from occupying excessive space of the sound-producing apparatus.

Preferably, the edge portion 22 of the flexible deformation portion 2 is of a structure that protrudes downward. The edge portion 22 protrudes downward and causes the flexible deformation portion 2 to occupy mainly the space in the volume expansion cavity; so that a normal distance can be maintained between the diaphragm 1 and the flexible deformation portion 2 without any need to reserve space for the height of the edge portion 22. To avoid noise, however, the distance between the diaphragm 1 and the flexible deformation portion 2 needs to ensure that when the flexible deformation portion 2 moves upward and is at the maximum amplitude, the diaphragm 1 and the flexible deformation portion 2 do not collide with each other. Such a structure where the flexible deformation portion 2 is combined with the first upper flux concentrating plate 311 allows the first upper flux concentrating plate 311 to be fixed and combined into an integrated whole with the rest of the magnetic circuit assembly 3 after the flexible deformation portion 2 is fixed and combined into an integrated whole with the first upper flux concentrating plate 311. Here, in the present embodiment, the upper surface of the first upper flux concentrating plate 311 is fixed and combined into an integrated whole with the flexible deformation portion 2, and the sinker 3110 is disposed on a side of the upper surface of the first upper flux concentrating plate 311 close to the volume expansion cavity. For the method of combining the first upper flux concentrating plate 311 with the flexible deformation portion 2, the magnetic circuit assembly 3 may be assembled into an integrated whole first, before the flexible deformation portion 2 is fixed and combined with the sinker 3110. This method of assembling the magnetic circuit assembly 3 first is beneficial to the positioning of each component of the magnetic circuit assembly 3 and to the accurate assembly of the magnetic circuit assembly 3.

It should be noted that, since the flexible deformation portion 2 is not limited to be combined with the first upper flux concentrating plate 311, it may also be combined with the central magnet 312 or the lower flux concentrating plate 30, or may also be combined between the first upper flux concentrating plate 311 and the central magnet 312, or may be combined between the central magnet 312 and the lower flux concentrating plate 30. In all five combination methods, after the flexible deformation portion 2 is fixed and combined into an integrated whole with the magnetic circuit assembly 3, the flexible deformation portion 2 as a whole is located in the volume expansion cavity. The uppermost end of the flexible deformation portion 2 is not higher than the upper end surface of the volume expansion cavity, such that there is no need for the sound-producing apparatus to reserve an avoidance space above the flexible deformation portion 2; and the lowermost end of the flexible deformation portion 2 is not lower than the lower end surface of the volume expansion cavity, such that the acoustic module or the electronic device equipped with the sound-producing apparatus does not need to reserve an avoidance space for the flexible deformation portion 2. Specifically, the edge portion 22 of the flexible deformation portion 2 in a static state does not protrude from the lower surface of the lower flux concentrating plate 30, as such, after the sound-producing apparatus is assembled with the electronic device or the acoustic module of a terminal, the acoustic module/electronic device does not need to provide the avoidance space for the flexible deformation portion 2, thereby improving the adaptability of the sound-producing apparatus. In addition, when the flexible deformation portion 2 vibrates downward, the maximum displacement thereof is not lower than the lower end surface of the volume expansion cavity. That is, a distance between the middle portion 21 of the flexible deformation portion 2 and the lower surface of the lower flux concentrating plate 30 is greater than the maximum amplitude of the flexible deformation portion 2. That is, the flexible deformation portion 2 occupies only the inner space of the sound-producing apparatus during its vibration without requiring the acoustic module/electronic device of the terminal to provide avoidance for the flexible deformation portion 2, and it is also possible to improve the adaptability of the product.

When this sound-producing apparatus is assembled into the acoustic module/electronic device, it is necessary for the volume expansion cavity to be in communication with the cavity in the acoustic module/electronic device, and only when the two cavities are in communication, the flexible deformation portion 2 can work normally; otherwise, if the bottom end of the volume expansion cavity is completely blocked by components in the acoustic module/electronic device, the space below the flexible deformation portion 2 of the volume expansion cavity will be a small space with a fixed internal volume, and the change of the air pressure in the space will hinder a normal vibration of the flexible deformation portion 2, causing the flexible deformation portion 2 to lose the function of adjusting the volume of the back acoustic cavity. Here, there is only need for a communication channel between the volume expansion cavity and the cavity in the acoustic module/electronic device, and there is no need for full communication between the two. With reference to FIG. 3, it is also necessary for the sound leakage hole 301 to be in communication with the cavity in the acoustic module/electronic device, so as to expand the volume of the back acoustic cavity of the sound-producing apparatus.

In order to prevent the flexible deformation portion 2 from being damaged during assembling or transporting of the sound-producing apparatus and prevent dust from falling into the sound-producing apparatus from the volume expansion cavity, preferably, a shield 35 covering the volume expansion cavity is provided on the lower surface of the lower flux concentrating plate 30. The shield 35 is provided with an air hole, which enables the volume expansion cavity to be in communication with the cavity in the acoustic module/electronic device. Here, the shield 35 may be a damping mesh or steel mesh, etc., may be directly fixed and combined with the lower flux concentrating plate 30 by bonding or the like, or may be fixed and combined with the lower flux concentrating plate 30 by means of the support member.

In the present disclosure, the middle region of the magnetic circuit assembly is hollowed out to form a volume expansion cavity penetrating through the magnetic circuit assembly, and a flexible deformation portion 2 is disposed on the volume expansion cavity, wherein the flexible deformation portion 2 separates the spaces on the upper and lower sides of the flexible deformation portion 2 from each other. During vibration of the diaphragm 1, the flexible deformation portion 2 vibrates up and down under the influence of the air pressure change on both sides of the diaphragm 1, so that the amplitude of the change of the air pressure between the diaphragm 1 and the flexible deformation portion 2 is reduced, thereby increasing the equivalent volume of the back acoustic cavity of the sound-producing apparatus and improves the sensitivity of the sound-producing apparatus at low frequencies.

EMBODIMENT 2

Figure 4:
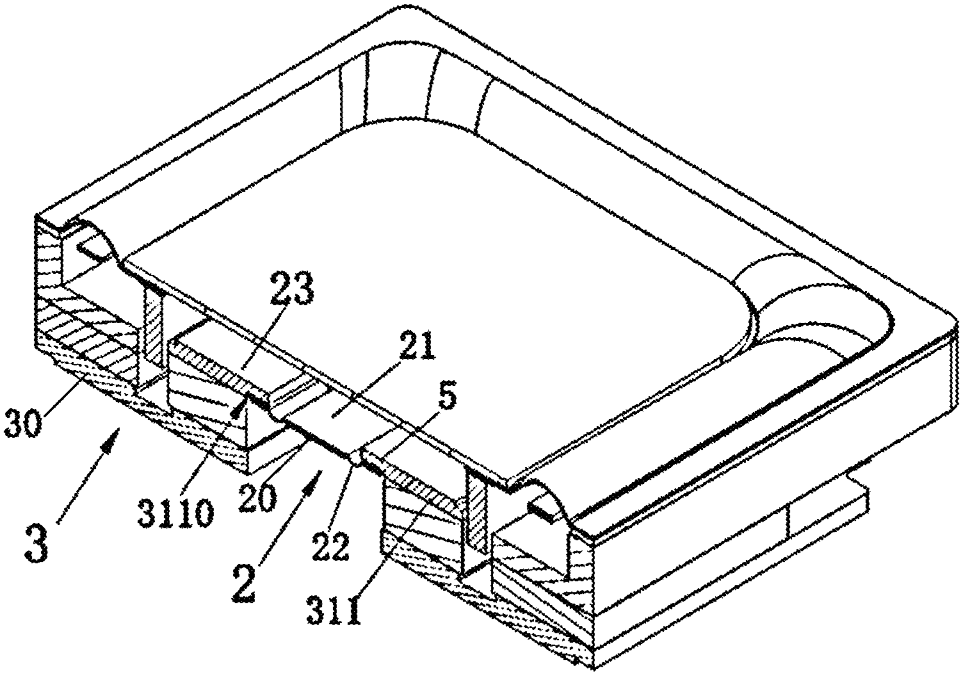
FIG. 4 is a cross-sectional view of another embodiment of a sound-producing device provided by the present disclosure.
Figure 5:
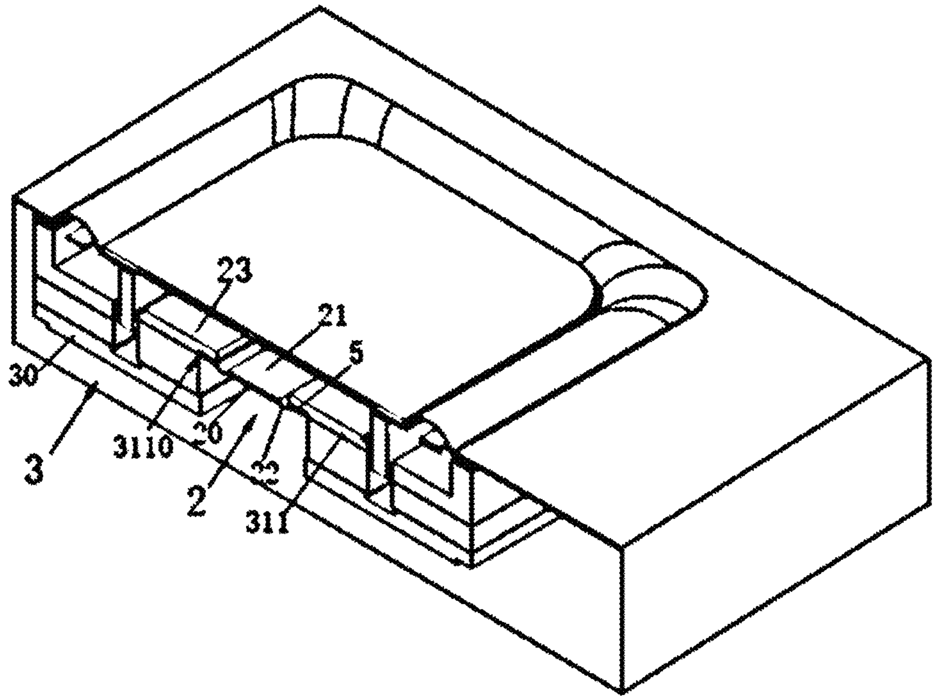
FIG. 5 cross-sectional view of an acoustic module provided by the present disclosure.

As shown in FIG. 4, there are three major differences between this embodiment and the embodiment 1: the flexible deformation portion 2 is combined with a composite sheet 20; the flexible deformation portion 2 is combined with the lower surface of the first upper flux concentrating plate 311; and a support member 5 is provided between the flexible deformation portion 2 and the first upper flux concentrating plate 311.

In this embodiment, the middle portion 21 of the flexible deformation portion 2 is combined with a flat plate-shaped composite sheet 20, which is a hard material and thus can prevent the middle portion 21 from vibrating in high frequency bands i.e. to prevent it from being out of synchronization, thereby making the vibration of the flexible deformation portion 2 more stable. The middle portion 21 may be a sheet-like structure as shown in the figure, or may be hollowed out in the middle with only the inner edge portion fixed and combined with the composite sheet 20 reserved; neither of the above influences the implementation of the present embodiment.

The flexible deformation portion 2 shown in the figure is combined with the lower surface of the first upper flux concentrating plate 311, dividing the volume expansion cavity into an upper part and a lower part. The first upper flux concentrating plate 311 is provided with an extension portion extending in the horizontal direction on one side of the volume expansion cavity, which extends in the direction of the central axis of the central magnetic circuit to form a convex structure. The sinker 3110 is provided on the lower surface of the extension portion, and is used for fixing the fixation portion 23 of the flexible deformation portion 2. Since the extension portion is of a size similar to that of the fixation portion 23, this structure with an extension portion does not reduce the size of the middle portion 21 and the edge portion 22 of the flexible deformation portion 2. Here, a support member 5 is also provided between the flexible deformation portion 2 and the sinker 3110. The support member 5 is first fixed and combined into an integrated whole with the flexible deformation portion 2, before the combination of the support member 5 and the flexible deformation portion 2 is fixed and combined with the sinker 3110. Providing the support member 5 facilitates the fixation and combination of the flexible deformation portion 2 and the sinker 3110; in addition, since the support member 5 functions in separation, it is possible to avoid the defect that the flexible deformation portion 2 is unfirmly fixed due to the temperature rise of the magnetic circuit assembly 3 during operation.

While certain specific embodiments of the present disclosure have been illustrated by way of example, it will be understood by those skilled in the art that the foregoing examples are provided for the purpose of illustration and are not intended to limit the scope of the present disclosure. It will be understood by those skilled in the art that the foregoing embodiments may be modified without departing from the scope and spirit of the disclosure. The scope of the present disclosure is subject to the attached claims.

The invention claimed is:

1. A sound-producing apparatus, comprising a vibration assembly and a magnetic circuit assembly, the vibration assembly comprises a diaphragm which vibrates to generate sound waves, wherein, a middle region of the magnetic circuit assembly is hollowed out to form a volume expansion cavity penetrating through the magnetic circuit assembly, with a flexible deformation portion being provided in the middle region of the magnetic circuit assembly located in the volume expansion cavity; and the flexible deformation portion is selected from the group consisting of the flexible deformation portion that covers a port of the volume expansion cavity and the flexible deformation portion that separates the volume expansion cavity into two regions that are isolated from each other;

wherein the flexible deformation portion is disposed facing the diaphragm, and is adapted to vibrate as a function of air pressure; and wherein at least a partial area of the flexible deformation portion is selected from the group consisting of Thermoplastic Polyurethanes (TPU), Thermoplastic Polyester Elastomer (TPEE), Liquid Crystal Polyester (LCP), Polyarylate (PAR), Polycarbonate (PC), Polyamide (PA), Polyphthalamide (PPA), Polyetheretherketone (PEEK), Polyetherimide (PEI), poly(ethylene naphthalate) (PEN), Poly(ether sulfones) (PES), Polyethylene terephthalate (PET), Polyimide (PI), PolyPhenyleneSulfide (PPS), Polyphenylene sulfone resins (PPSU), Polysulfone (PSU), rubber and silicone rubber.

2. The sound-producing apparatus of claim 1, wherein the magnetic circuit assembly comprises a sequentially combined upper flux concentrating plate, a magnet and a lower flux concentrating plate;

wherein the flexible deformation portion is selected from the group consisting of the flexible deformation portion combined with the upper flux concentrating plate, the flexible deformation portion combined with the magnet, t flexible deformation portion combined with the lower flux concentrating plate, the flexible deformation portion combined between the upper flux concentrating plate and the magnet, and the flexible deformation portion combined between the magnet and the lower flux concentrating plate.

3. The sound-producing apparatus of claim 2, wherein the flexible deformation portion comprises a middle portion located in the middle thereof, an edge portion located at the edge thereof, and a fixation portion located on an outer periphery of the edge portion;

wherein the middle portion is a plane structure, the edge portion is a convex cambered surface structure, and the fixation portion is adapted for fixing and integrating with the magnetic circuit assembly.

4. The sound-producing apparatus of claim 3, wherein, a support ring is provided between the flexible deformation portion and the magnetic circuit assembly, or the fixation portion of the flexible deformation portion is directly fixed and combined with the magnetic circuit assembly.

5. The sound-producing apparatus of claim 4, wherein the flexible deformation portion is selected from the group consisting of:

the flexible deformation portion fixed and combined with the upper flux concentrating plate, with a sinker for fixing the flexible deformation portion being provided at a position on the upper flux concentrating plate corresponding to the fixation portion;

the flexible deformation portion combined with a side of the upper flux concentrating plate close to the diaphragm, with a sinker provided on an upper edge of the upper flux concentrating plate; and the flexible deformation portion combined with a side of the upper flux concentrating plate away from the diaphragm, wherein a lower edge of the upper flux concentrating plate is provided with a sinker, the upper flux concentrating plate is provided with an extension portion extending in the horizontal direction on a side of the volume expansion cavity, and the sinker is provided on the extending portion of the upper flux concentrating plate protruding from the magnet.

6. The sound-producing apparatus of claim 5, wherein, the flexible deformation portion has the edge portion protruding downward, and is free from collision with the diaphragm during vibration.

7. The sound-producing apparatus of claim 2, wherein, a shield covering the volume expansion cavity is provided at a position on an outer surface of the lower flux concentrating plate which position faces the volume expansion cavity, the shield being a breathable component.

8. The sound-producing apparatus of claim 1, wherein, the flexible deformation portion is a planar structure; or, the flexible deformation portion has a planar structure in the middle thereof and a wave-shaped structure at the edge thereof.

9. The sound-producing apparatus of claim 1, wherein, the flexible deformation portion is located in the volume expansion cavity, and has an uppermost end not higher than an upper end surface of the volume expansion cavity and a lowermost end not lower than the lower end surface of the volume expansion cavity; and when vibrating downward, the flexible deformation portion at the maximum displacement is not lower than the lower end surface of the volume expansion cavity.

10. The sound-producing apparatus of claim 9, wherein, the lower flux concentrating plate is provided with a sound leakage hole at an edge thereof, and a distance between the sound leakage hole and the diaphragm is greater than a distance between the flexible deformation part and the diaphragm.

11. The sound-producing apparatus of claim 9, wherein, the volume expansion cavity and the magnetic circuit assembly have the same shape and are disposed concentrically; the flexible deformation portion has the same shape as that of the volume expansion cavity.

12. The sound-producing apparatus of claim 9, wherein, the magnetic circuit assembly includes a central magnetic circuit located at the center thereof and a side magnetic circuit located at an edge thereof, and the volume expansion cavity is provided in a middle region of the central magnetic circuit and penetrates through the magnetic circuit assembly.

13. An acoustic module, comprising the sound-producing apparatus of claim 1, the acoustic module has a cavity, and the volume expansion cavity is in communication with the cavity of the acoustic module.

* * * * *